(12) United States Patent
Yabe

(10) Patent No.: US 7,394,017 B2
(45) Date of Patent: Jul. 1, 2008

(54) ARMORING SHEET FOR WIRE HARNESS AND METHOD OF ATTACHING THE SAME

(75) Inventor: Kazuyoshi Yabe, Kosai (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 11/442,349

(22) Filed: May 30, 2006

(65) Prior Publication Data

US 2006/0289197 A1    Dec. 28, 2006

(30) Foreign Application Priority Data

May 27, 2005    (JP)    ............ P2005-156168

(51) Int. Cl.
H01B 11/06    (2006.01)
(52) U.S. Cl. .......................... 174/36; 174/93
(58) Field of Classification Search ............ 174/36, 174/93
See application file for complete search history.

(56) References Cited

U.S. PATENT DOCUMENTS 2,960,561 A * 11/1960 Plummer ............... 174/36
6,806,417 B2 * 10/2004 Murakami et al. ........... 174/36

FOREIGN PATENT DOCUMENTS

| DE | 3211796 | * | 1/1983 |
|---|---|---|---|
| EP | 0 886 357 A2 | | 12/1998 |
| JP | 58-81990 U | | 6/1983 |
| JP | 5-15615 U | | 2/1993 |
| JP | 7-4368 U | | 1/1995 |
| JP | 7-6166 U | | 1/1995 |
| JP | 8-70526 A | | 3/1996 |
| JP | 11-252739 A | | 9/1999 |
| JP | 2001-118432 A | | 4/2001 |

\* cited by examiner

*Primary Examiner*—Chau N Nguyen
(74) *Attorney, Agent, or Firm*—Sughrue Mion, PLLC

(57) ABSTRACT

An armoring sheet for being attached to a wire harness, includes a sheet body that is formed in a flat plate shape and has a first face and a second face which is opposed to the first face, and a first adhesive portion and a second adhesive portion that are provided on the first face of the sheet body. The first adhesive portion is disposed at one end portion of the first face. The second adhesive portion is disposed at other portion of the first face than the one end portion of the first face.

7 Claims, 12 Drawing Sheets

ARMORING SHEET FOR WIRE HARNESS AND METHOD OF ATTACHING THE SAME

BACKGROUND OF THE INVENTION

This invention relates to a wire harness-armoring sheet for being attached to a wire harness and also to a method of attaching the armoring sheet.

Wire harness-armoring sheets are already known (see, for example, Patent Literatures 1 to 3).

FIG. 12 is a plan view showing a cover member disclosed in Patent Literature 1, FIG. 13 is a perspective view showing a condition in which wires are in the process of being bound together by the cover member of FIG. 12, FIGS. 14A and 14B are cross-sectional views of examples of attaching methods, showing a condition in which the wires are bound together by the cover member of FIG. 12, and FIG. 15 is a perspective view of an important portion, showing a condition in which the cover member of FIG. 12 is attached to a wire harness.

Referring to FIGS. 12 to 15, a pressure-sensitive adhesive double coated tape 102 is provided at one end portion of one surface (or side) of a cover base sheet 101 of the cover member 100.

As shown in FIG. 14A, the cover member 100 is wound in a tubular shape on the periphery of the wire harness W, and the superposed opposite end portions thereof are bonded together by the adhesive double coated tape 102. Thus, the cover member 100 is attached to the wire harness W.

In another attaching method, the cover member 100 is wound in a tubular shape on the periphery of the wire harness W, and in this condition the opposite end portions thereof are bonded together by the adhesive double coated tape 102 at a position spaced radially outwardly of the wire harness W, as shown in FIG. 14. Thus, the cover member 100 is attached to the wire harness W.

FIG. 16 is a plan view showing a wire harness-binding sheet disclosed in Patent Literature 2, and FIG. 17 is a cross-sectional view showing a condition in which a wire harness is bound by the wire harness-binding sheet of FIG. 16.

In the wire harness-binding sheet 110, an adhesive tape 111, having an adhesive surface, is bonded to a base sheet 112 of a rectangular or a square shape, and extends along one end thereof, and a bonding surface 113 (to which the adhesive surface is to be bonded) is provided at the opposite end portion of the base sheet 112 remote from the one end thereof, as shown in FIG. 16. The base sheet 112 is wound in a tubular shape on the periphery of the wire harness W, and the superposed opposite end portions are bonded together by the adhesive tape 111 as shown in FIG. 17. Thus, the sheet 110 is attached to the wire harness W.

FIG. 18 is a perspective view showing a distribution wire-binding tube disclosed in Patent Literature 3.

In the distribution wire-binding tube 120, a male member 123 of a velvet-type fastener 122 is provided on a front surface of a sheet base member 121 at one side edge portion thereof, and a female member 124 of the velvet-type fastener 122 is provided on a reverse surface of the sheet base member 121 at the opposite side edge portion thereof spaced from the one side edge portion in a direction of a width thereof, as shown in FIG. 18. The sheet base member 121 is wound in a tubular shape on a periphery of a wire harness W, and the superposed opposite end portions thereof are fastened together by the velvet-type fastener 122. Thus, the sheet base member 121 is attached to the wire harness W.

[Patent Literature 1] JP-UM-A-58-81990 (Page 1, FIGS. 1 and 2)

[Patent Literature 2] JP-UM-A-7-6166 (Pages 1 to 2, FIGS. 1 and 3)

[Patent Literature 3] JP-UM-A-7-4368 (Pages 1 to 2, FIG. 1)

However, in the related cover member 100 shown in FIG. 12, the cover base sheet 101 is not fixed directly to the wire harness W by either of the attaching methods of FIGS. 14A and 14B. Therefore, the cover base member 101 is displaced relative to the wire harness W during the attaching operation, so that the efficiency of the operation is low. And besides, opposite end portions of the wound cover base member 101 need to be manually fixed to the outer peripheral surface of the wire harness W (see portions designated by reference character A in FIG. 15) by a vinyl tape 103 or the like after the cover member 100 is attached to the wire harness W. Therefore, there has been encountered a problem that much processing time and the increased cost have been required.

A problem similar to the problem with the cover member 100 of FIG. 12 has also been encountered in both of the conventional wire harness-bonding sheet 110 of FIGS. 16 and 17 and the conventional distribution wire-binding tube 120 of FIG. 18.

SUMMARY OF THE INVENTION

This invention has been made in view of the above circumstances, and an object of the invention is to provide an armoring sheet for a wire harness which can be rapidly and positively attached to the wire harness, thereby reducing the attaching time and the cost.

1) A wire harness-armoring sheet of the present invention for being attached to a wire harness, comprising:

a sheet body that is formed in a flat plate shape and has a first face and a second face which is opposed to the first face; and a first adhesive portion and a second adhesive portion that are provided on the first face of the sheet body, wherein the first adhesive portion is disposed at one end portion of the first face; and wherein the second adhesive portion is disposed at other portion of the first face than the one end portion of the first face.

2) The armoring sheet of the above Paragraph 1), wherein the first and second adhesive portions are provided respectively at the opposite end portions of the first face of the sheet body, and extend generally parallel to one edge of the first face.

The armoring sheet of the above construction is disposed in such a manner that the first face of the sheet body, having the two adhesive portions formed thereon, can serve as an inner surface, and in this condition one of the two adhesive portions or one longitudinal end portions of the two adhesive portions are adhesively fixed to an outer peripheral surface of the wire harness. Subsequently, the sheet body is wound on the outer periphery of the wire harness, and subsequently the other adhesive portion or the other longitudinal end portions of the two adhesive portions are adhesively fixed to an outer surface of the sheet body wound on the outer periphery of the wire harness in an amount exceeding the length of the outer periphery of the wire harness. Therefore, the attaching of the armoring sheet to the wire harness can be effected rapidly and positively, and there can be obtained the armoring sheet which has the excellent attachability for the wire harness.

3) The armoring sheet of the above Paragraph 2), wherein the distance between the first adhesive portion and the second adhesive portion is greater than a length of an outer periphery of the wire harness.

The armoring sheet of the above construction is disposed in such a manner that the one surface of the sheet body, having the two adhesive portions formed thereon, can serve as an inner surface and that the adhesive portions are disposed substantially parallel to the wire harness which is to be armored, and in this condition one of the two adhesive portions is adhesively fixed to the outer peripheral surface of the wire harness. Subsequently, the sheet body is wound on the outer periphery of the wire harness, and subsequently the other adhesive portion is adhesively fixed to the outer surface of the sheet body wound on the outer periphery of the wire harness in an amount exceeding the length of the outer periphery of the wire harness. Therefore, the attaching of the armoring sheet to the wire harness can be effected rapidly and positively, and there can be obtained the armoring sheet which has the excellent attachability for the wire harness.

4) The armoring sheet of any one of the above Paragraphs 1) to 3), further comprising a positioning member that is provided on at least one of the first face and the second face of the sheet body. When the armoring sheet is attached to the wire harness, the positioning member engages one end portion and the other end portion of the sheet body with each other to position the one end portion and the other end portion of the sheet body.

In the armoring sheet of the above construction, one of the adhesive portions is adhesively bonded to the outer peripheral surface of the wire harness, and the sheet body is wound on the outer periphery of the wire harness. When the sheet body is thus wound on the outer periphery of the wire harness in an amount exceeding the length of this outer periphery, the positioning of the armoring sheet is effected by the positioning member which engages the one end portion and the other end portion of the sheet body with each other. Therefore, the armoring sheet can be attached to the wire harness without being displaced relative thereto, and as a result the certainty can be secured, and there can be obtained the armoring sheet which has the excellent attachability for the wire harness.

5) The armoring sheet of the above Paragraph 4), the positioning member includes at least one first projection and a second projection. The at least one projection is formed on the first face of the sheet body in adjacent, parallel to the first adhesive portion provided at the one end portion of the first face. The second projection is formed on the second face of the sheet body along the second adhesive portion formed at the other end portion of the first face.

In the armoring sheet of the above construction, one of the adhesive portions is adhesively bonded to the outer peripheral surface of the wire harness, and the sheet body is wound on the outer periphery of the wire harness. When the sheet body is thus wound on the outer periphery of the wire harness in an amount exceeding the length of this outer periphery, the (at least one) one end-side projection and the other end-side projection are engaged with each other, thereby effecting the positioning of the armoring sheet. Therefore, the armoring sheet can be attached to the wire harness without being displaced relative thereto, and as a result the certainty can be secured, and there can be obtained the armoring sheet which has the excellent attachability for the wire harness.

6) The armoring sheet of the above Paragraph 5), wherein the at least one first projection and the second projection are inclined toward each other.

In the armoring sheet of the above construction, one of the adhesive portions is adhesively bonded to the outer peripheral surface of the wire harness, and the sheet body is wound on the outer periphery of the wire harness. When the sheet body is thus wound on the outer periphery of the wire harness in an amount exceeding the length of this outer periphery, the (at least one) one end-side projection and the other end-side projection are engaged with each other, thereby effecting the positioning of the armoring sheet. At this time, these projections are less liable to be disengaged from each other since they are inclined toward each other, and therefore the armoring sheet can be attached to the wire harness without being displaced relative thereto. As a result, the certainty can be secured, and there can be obtained the armoring sheet which has the excellent attachability for the wire harness.

7) The armoring sheet of any one of the above Paragraphs 1) to 3), wherein a longitudinal dimension of each of the first and second adhesive portions is greater than a length of the outer periphery of the wire harness.

The armoring sheet of the above construction is disposed in such a manner that the one surface of the sheet body, having the two adhesive portions formed thereon, can serve as the inner surface and that the adhesive portions are disposed generally perpendicular to the wire harness which is to be armored, and in this condition one end portions of the two adhesive portions are adhesively fixed to the outer peripheral surface of the wire harness. Subsequently, the sheet body is wound on the outer periphery of the wire harness, with the two adhesive portions adhesively fixed to the outer peripheral surface of the wire harness, and subsequently the other end portions of the two adhesive portions are adhesively fixed to the outer surface of the sheet body wound on the outer periphery of the wire harness in an amount exceeding the length of the outer periphery of the wire harness. Therefore, the attaching of the armoring sheet to the wire harness can be effected rapidly and positively, and there can be obtained the armoring sheet which has the excellent attachability for the wire harness.

8) A method of attaching an armoring sheet for being attached to a wire harness, comprises:

providing the armoring sheet including a sheet body that is formed in a flat plate shape and has a first face and a second face which is opposed to the first face, and a first adhesive portion and a second adhesive portion that are provided on the first face of the sheet body, the first adhesive portion disposed at one end portion of the first face, and the second adhesive portion disposed at other portion of the first face than the one end portion of the first face, the first and second adhesive portions provided respectively at the opposite end portions of the first face of the sheet body, and extend generally parallel to one edge of the first face, and the distance between the first adhesive portion and the second adhesive portion being greater than a length of an outer periphery of the wire harness;

adhesively fixing one of the firsthand second adhesive portions to an outer peripheral surface of the wire harness in a condition that the armoring sheet is arranged in a manner that the first face of the sheet body serving as an inner surface faces to the wire harness and the first and second adhesive portions are disposed substantially parallel to the wire harness;

winding the sheet body of the armoring sheet on the outer periphery of the wire harness in an amount exceeding the length of the outer periphery of the wire harness; and adhesively fixing the other of the first and second adhesive portions to the second face of the sheet body.

In the above wire harness-armoring sheet attaching method, the two adhesive portions are disposed substantially parallel to the wire harness, and in this condition the one adhesive portion is adhesively fixed to the outer peripheral surface of the wire harness, and subsequently the sheet body is wound on the outer periphery of the wire harness, and subsequently the other adhesive portion is adhesively fixed to the outer surface of the sheet body wound on the outer periphery of the wire harness in an amount exceeding the length of the outer periphery of the wire harness. With this method, the attaching of the armoring sheet to the wire harness can be effected rapidly and positively, and there can be obtained the armoring sheet attaching method which can provide the excellent attachability of the armoring sheet for the wire harness.

9) A method of attaching an armoring sheet for being attached to a wire harness, comprises:

providing the armoring sheet including a sheet body that is formed in a flat plate shape and has a first face and a second face which is opposed to the first face, and a first adhesive portion and a second adhesive portion that are provided on the first face of the sheet body, the first adhesive portion disposed at one end portion of the first face, and the second adhesive portion disposed at other portion of the first face than the one end portion of the first face, the first and second adhesive portions provided respectively at the opposite end portions of the first face of the sheet body, and extend generally parallel to one edge of the first face, and the distance between the first adhesive portion and the second adhesive portion being greater than a length of an outer periphery of the wire harness;

adhesively fixing one end portions of the first and second adhesive portions to an outer peripheral surface of the wire harness in a condition that the armoring sheet is arranged in a manner that the first face of the sheet body serving as an inner surface faces to the wire harness and the first and second adhesive portions are disposed substantially perpendicular to the wire harness;

winding the sheet body of the armoring sheet on the outer periphery of the wire harness in an amount exceeding the length of the outer periphery of the wire harness; and adhesively fixing the other end portions of the first and second adhesive portions to the second face of the sheet body.

In the above wire harness-armoring sheet attaching method, the two adhesive portions are disposed substantially perpendicular to the wire harness, and in this condition the one end portions of the two adhesive portions are adhesively fixed to the outer peripheral surface of the wire harness, and subsequently the sheet body is wound on the outer periphery of the wire harness, with the two adhesive portions adhesively fixed to the outer peripheral surface of the wire harness, and subsequently the other end portions of the two adhesive portions are adhesively fixed to the outer surface of the sheet body wound on the outer periphery of the wire harness in an amount exceeding the length of the outer periphery of the wire harness. With this method, the attaching of the armoring sheet to the wire harness can be effected rapidly and positively, and there can be obtained the armoring sheet attaching method which can provide the excellent attachability of the armoring sheet for the wire harness.

10) A method of attaching an armoring sheet for being attached to a wire harness, comprises:

providing the armoring sheet including a sheet body that is formed in a flat plate shape and has a first face and a second face which is opposed to the first face, a first adhesive portion and a second adhesive portion that are provided on the first face of the sheet body, and at least one first projection and a second projection, the first adhesive portion disposed at one end portion of the first face, the second adhesive portion disposed at other portion of the first face than the one end portion of the first face, the at least one first projection engaging the second projection to position one end portion and the other end portion of the sheet body when the armoring sheet is attached to the wire harness, the at least one projection formed on the first face of the sheet body in adjacent, parallel to the first adhesive portion provided at the one end portion of the first face, the second projection formed on the second face of the sheet body along the second adhesive portion formed at the other end portion of the first face, and the at least one first projection and the second projection being inclined toward each other;

adhesively fixing the second adhesive portion to an outer peripheral surface of the wire harness in a condition that the armoring sheet is arranged in a manner that the first face of the sheet body serving as an inner surface faces to the wire harness and the first and second adhesive portions are disposed substantially parallel to the wire harness;

winding the sheet body of the armoring sheet on the outer periphery of the wire harness in an amount exceeding the length of the outer periphery of the wire harness;

engaging the at least one first projection with the second projection on the second face of the sheet body; and adhesively fixing the first adhesive portion to the second face of the sheet body.

In the above wire harness-armoring sheet attaching method, the two adhesive portions are disposed substantially parallel to the wire harness, and in this condition the adhesive portion, disposed in the vicinity of the projection formed on the other surface of the sheet body, is adhesively fixed to the outer peripheral surface of the wire harness, and subsequently the sheet body is wound on the outer periphery of the wire harness, and subsequently the at least one projection is engaged with the projection on the other surface of the sheet body at the outer surface of the sheet body wound on the outer periphery of the wire harness in an amount exceeding the length of the outer periphery of the wire harness, and also the adhesive portion, disposed in the vicinity of the at least one projection, is adhesively fixed to the outer surface of the sheet body. With this method, the attaching of the armoring sheet to the wire harness can be effected rapidly and positively, and there can be obtained the armoring sheet attaching method which can provide the excellent attachability of the armoring sheet for the wire harness.

The armoring sheet of the present invention can be rapidly and positively attached to the wire harness, and therefore the attaching time and the cost can be reduced.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

The present invention will now be described by way of an illustrated embodiment.

Figure 1:
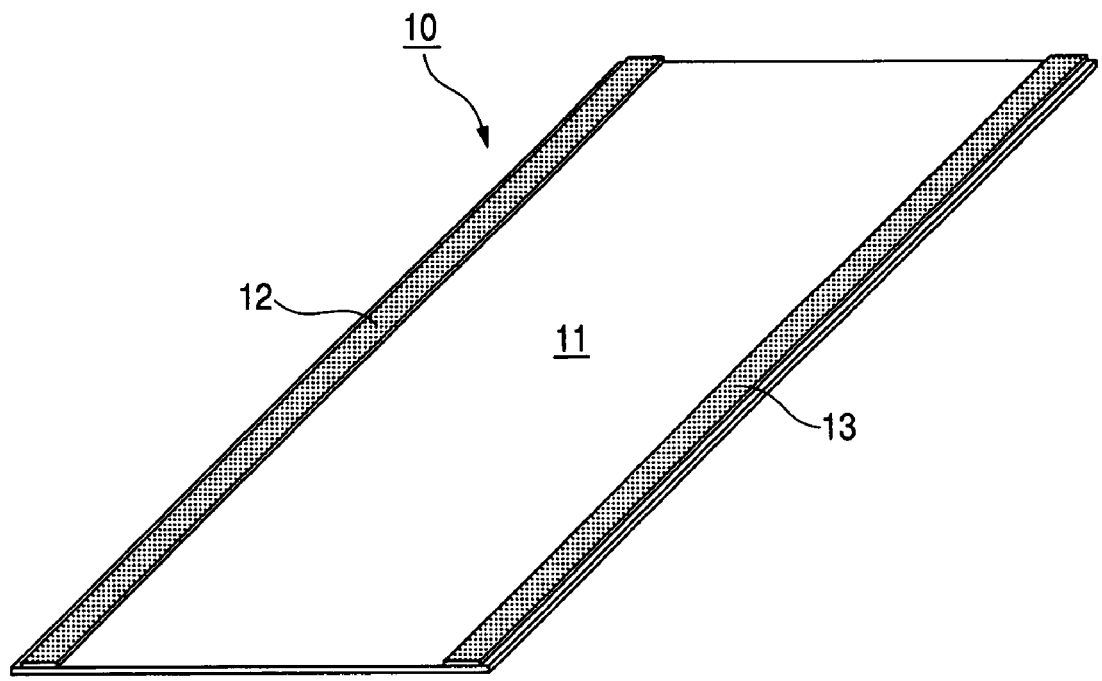
FIG. 1 is a perspective view showing a wire harness-armoring sheet according to a first embodiment of the present invention.
Figure 2:
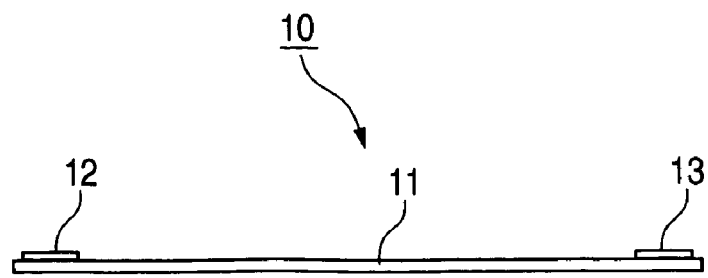
FIG. 2 is a side-elevational view of the wire harness-armoring sheet of FIG. 1.
Figure 3:
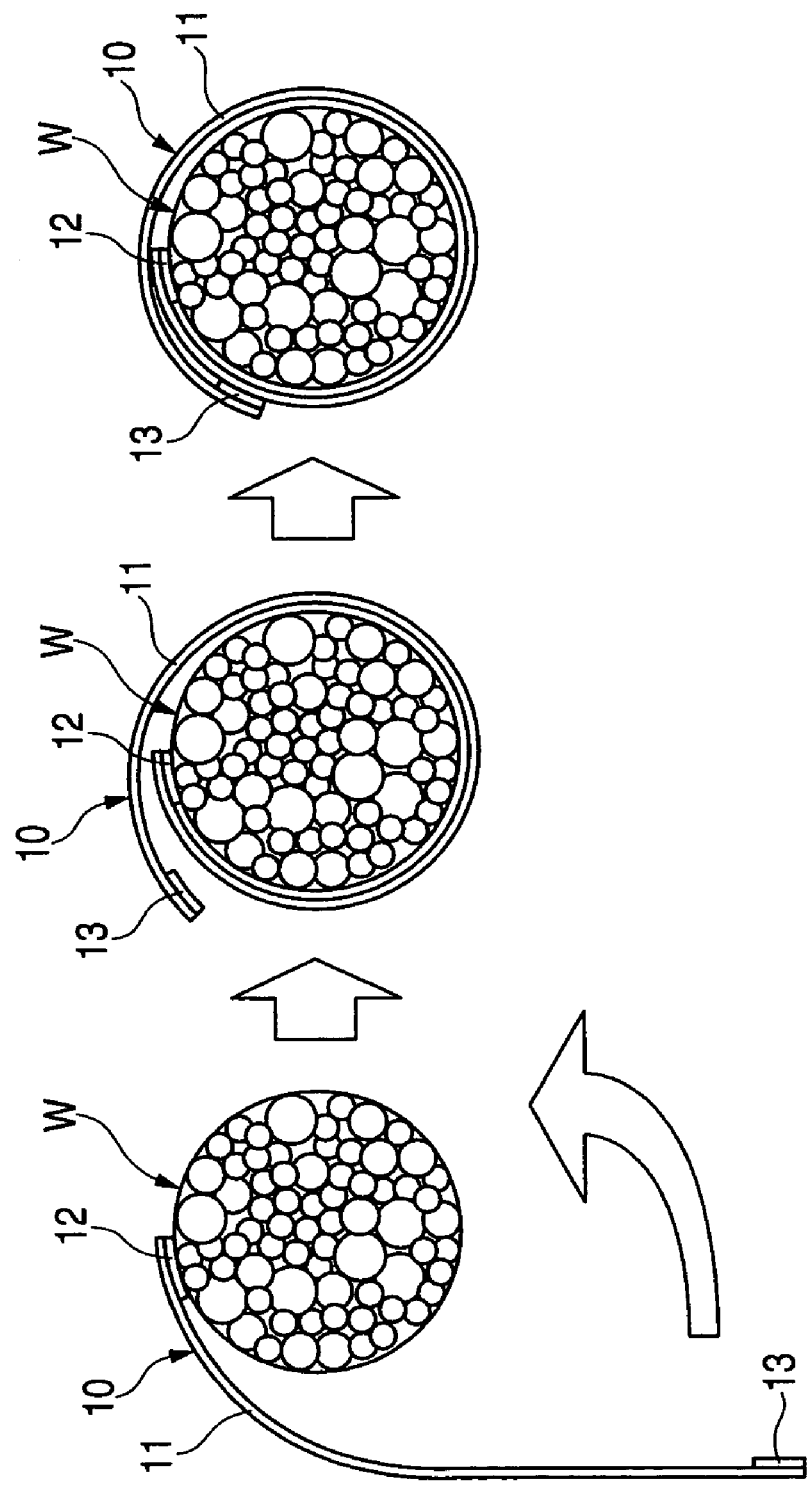
FIG. 3 is a cross-sectional view showing one example of a method of attaching the wire harness-armoring sheet of FIG. 1 to a wire harness.
Figure 4:
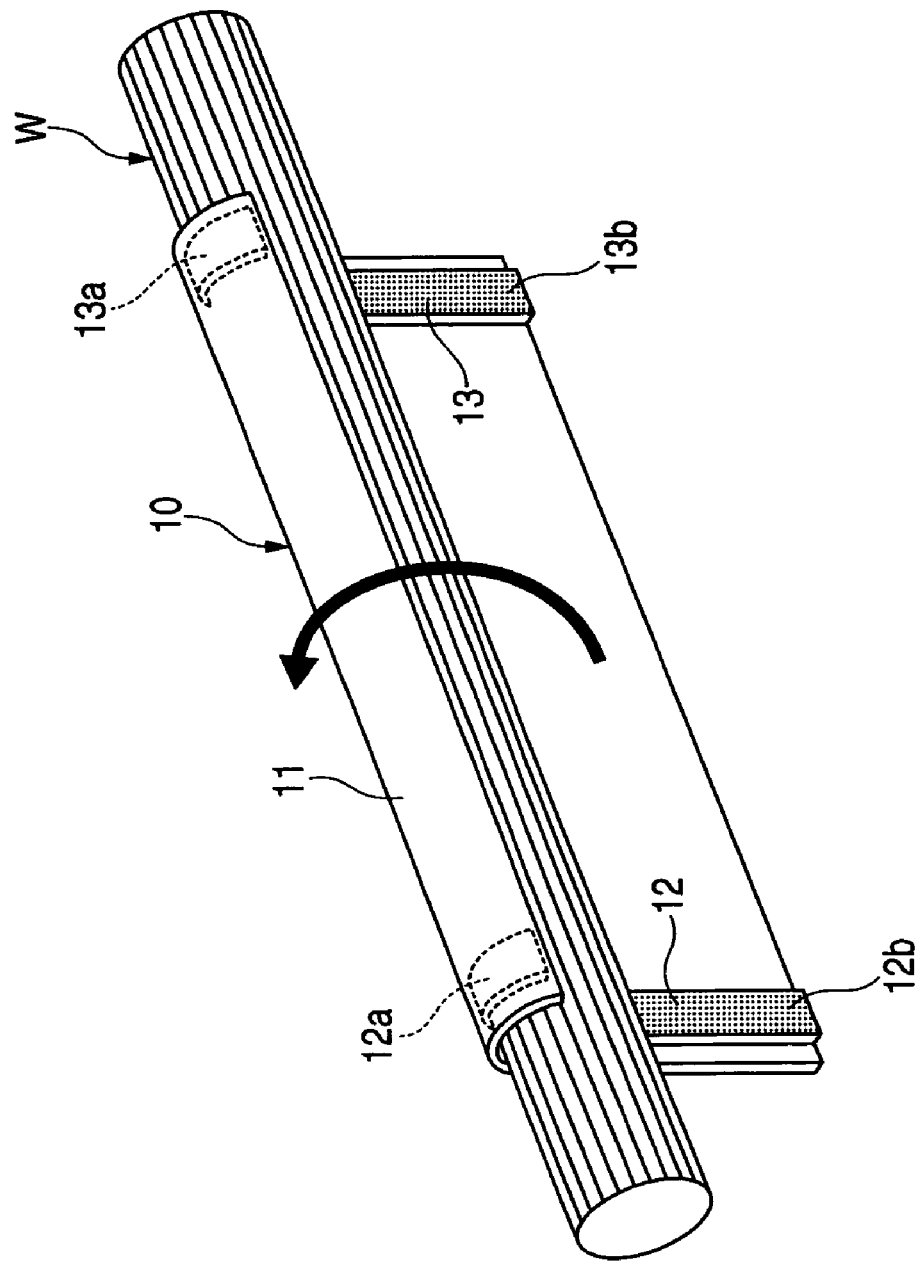
FIG. 4 is a perspective view showing another example of a method of attaching the wire harness-armoring sheet of FIG. 1 to the wire harness.

FIG. 1 is a perspective view showing a first embodiment of a wire harness-armoring sheet of the present invention, and FIG. 2 is a side-elevational view of the wire harness-armoring sheet of FIG. 1. FIG. 3 is a cross-sectional view showing one example of a method of attaching the wire harness-armoring sheet of FIG. 1 to a wire harness, and FIG. 4 is a perspective view showing another example of a method of attaching the wire harness-armoring sheet of FIG. 1 to the wire harness.

The wire harness-armoring sheet according to the first embodiment of the invention will be described.

Referring to FIGS. 1 to 4, the wire harness-armoring sheet 10 of the first embodiment includes a sheet body 11 formed into a flat plate-like shape, and a pair of adhesive portions 12 and 13 which are formed respectively on widthwise-opposite end portions (left and right end portions in FIG. 1) of one surface (upper surface in FIG. 1) of the sheet body 11, and extend generally parallel to one edge of the sheet body 11. The wire harness-armoring sheet 10 is attached to the wire harness which is to be armored.

The distance between the two adhesive portions 12 and 13, formed on the one surface of the sheet body 11, is larger than a length of the outer periphery of the wire harness W, or a longitudinal length of each of the adhesive portions 12 and 13 on the sheet body 11 is larger than the length of the outer periphery of the wire harness W.

Each of the adhesive portions 12 and 13 is formed, for example, by an adhesive coated on the one surface of the sheet body 11 or by a pressure-sensitive adhesive double coated tape bonded to the one surface of the sheet body 11.

Examples of methods of attaching the wire harness-armoring sheet 10 to the wire harness W include ones shown respectively in FIGS. 3 and 4. These attaching methods will be described below in detail Referring to FIG. 3, the wire harness-armoring sheet 10 is disposed in such a manner that the one surface of the sheet body 11, having the adhesive portions 12 and 13 formed thereon, can serve as an inner surface and that the adhesive portions 12 and 13 are disposed generally parallel to the wire harness W. In this condition, one adhesive portion 12 of the wire harness-armoring sheet 10 is adhesively fixed to the outer peripheral surface of the wire harness W (as shown in a left illustration of FIG. 3).

Then, the sheet body 11 of the wire harness-armoring sheet 10 is wound on the outer periphery of the wire harness W (as shown in a middle illustration of FIG. 3). Then, the other adhesive portion 13 is adhesively fixed to an outer surface of the sheet body 11 (of the wire harness-armoring sheet 10) wound on the outer periphery of the wire harness W in an amount exceeding the length of the outer periphery of the wire harness W (as shown in a right illustration of FIG. 3).

On the other hand, referring to FIG. 4, the wire harness-armoring sheet 10 is disposed in such a manner that the one surface of the sheet body 11, having the adhesive portions 12 and 13 formed thereon, can serve as an inner surface and that the adhesive portions 12 and 13 are disposed generally perpendicular to the wire harness W which is to be armored. In this condition, one longitudinal end portions 12a and 13a of the adhesive portions 12 and 13 of the wire harness-armoring sheet 10 are adhesively fixed to the outer peripheral surface of the wire harness W.

Then, the sheet body 11 of the wire harness-armoring sheet 10 is wound on the outer periphery of the wire harness W, with the adhesive portions 12 and 13 adhesively fixed to the outer peripheral surface of the wire harness W. Then, the other longitudinal end portions 12b and 13b of adhesive portions 12 and 13 are adhesively fixed to the outer surface of the sheet body 11 (of the wire harness-armoring sheet 10) wound on the outer periphery of the wire harness W in an amount exceeding the length of the outer periphery of the wire harness W.

Thus, in the wire harness-armoring sheet 10 of the above first embodiment, the one adhesive portion 12 (see FIG. 3) or the one longitudinal end portions 12a and 13a (see FIG. 4) of the adhesive portions 12 and 13 are adhesively fixed to the outer peripheral surface of the wire harness W, and the other adhesive portion 13 (see FIG. 3) or the other longitudinal end portions 12b and 13b (see FIG. 4) of the adhesive portions 12 and 13 are adhesively fixed to the outer surface of the sheet body 11 wound on the outer periphery of the wire harness W in an amount exceeding the length of the outer periphery of the wire harness W.

Therefore, after the wire harness-armoring sheet 10 is attached to the wire harness W, the displacement of the wire harness-armoring sheet 10 relative to the wire harness W and other troubles can be prevented, and this obviates the need for manually fixing the opposite end portions of the wound sheet body 11 to the outer peripheral surface of the wire harness W by a vinyl tape or the like. Therefore, the wire harness-armoring sheet 10 can be rapidly and positively attached to the wire harness W, and the attaching time and the cost can be reduced.

And besides, the adhesive portions 12 and 13 are formed only on part of the sheet body 11, and therefore for example, a disadvantage that the flexibility of the wire harness W is adversely affected as a result of attaching the wire harness-armoring sheet 10 thereto can be avoided.

Next, a second embodiment of the invention will be described with reference to FIGS. 5 to 8.

Figure 5:
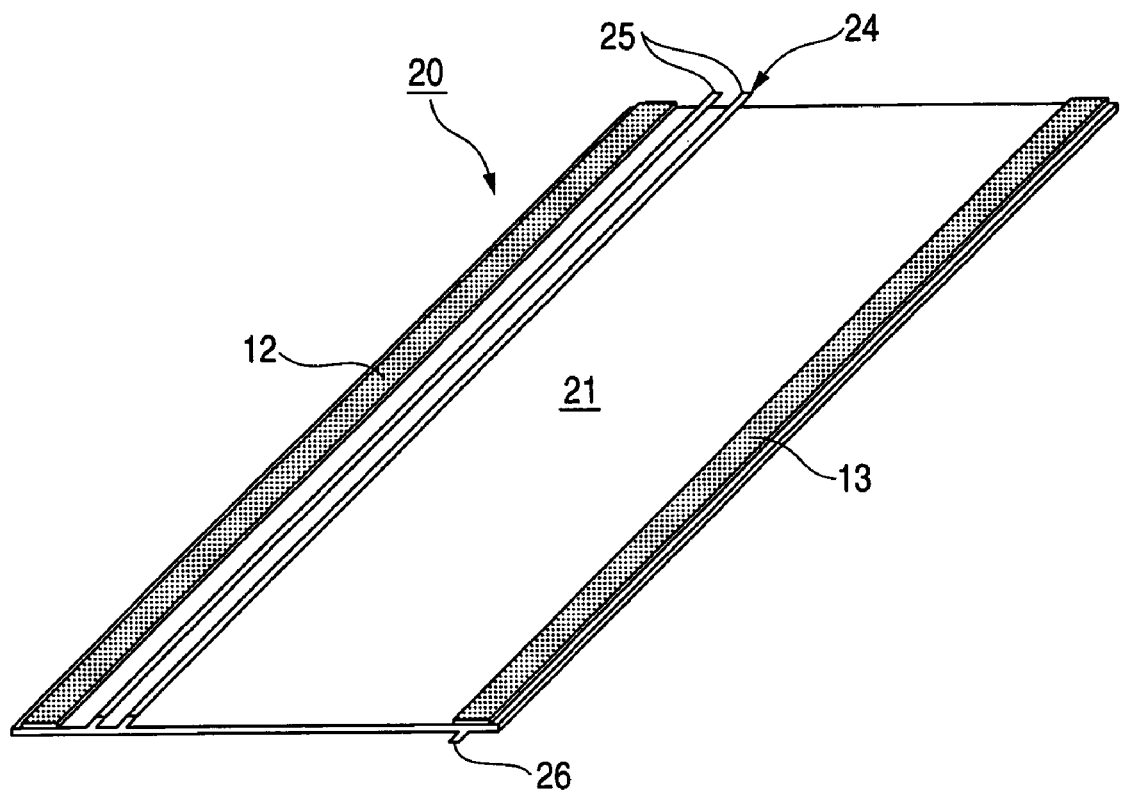
FIG. 5 is a perspective view showing a wire harness-armoring sheet according to a second embodiment of the invention.
Figure 6:
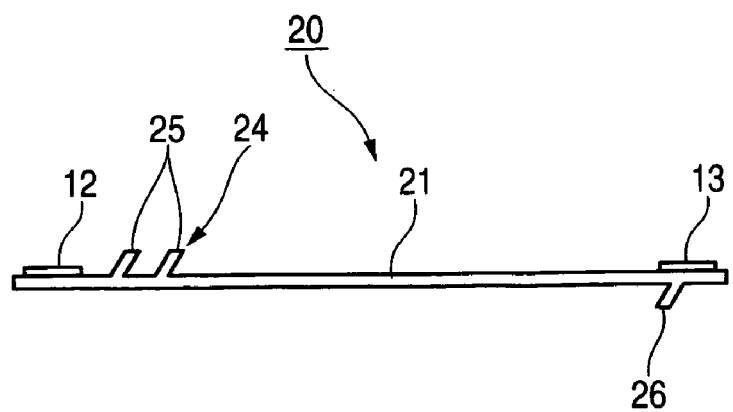
FIG. 6 is a side-elevational view of the wire harness-armoring sheet of FIG. 5.
Figure 7:
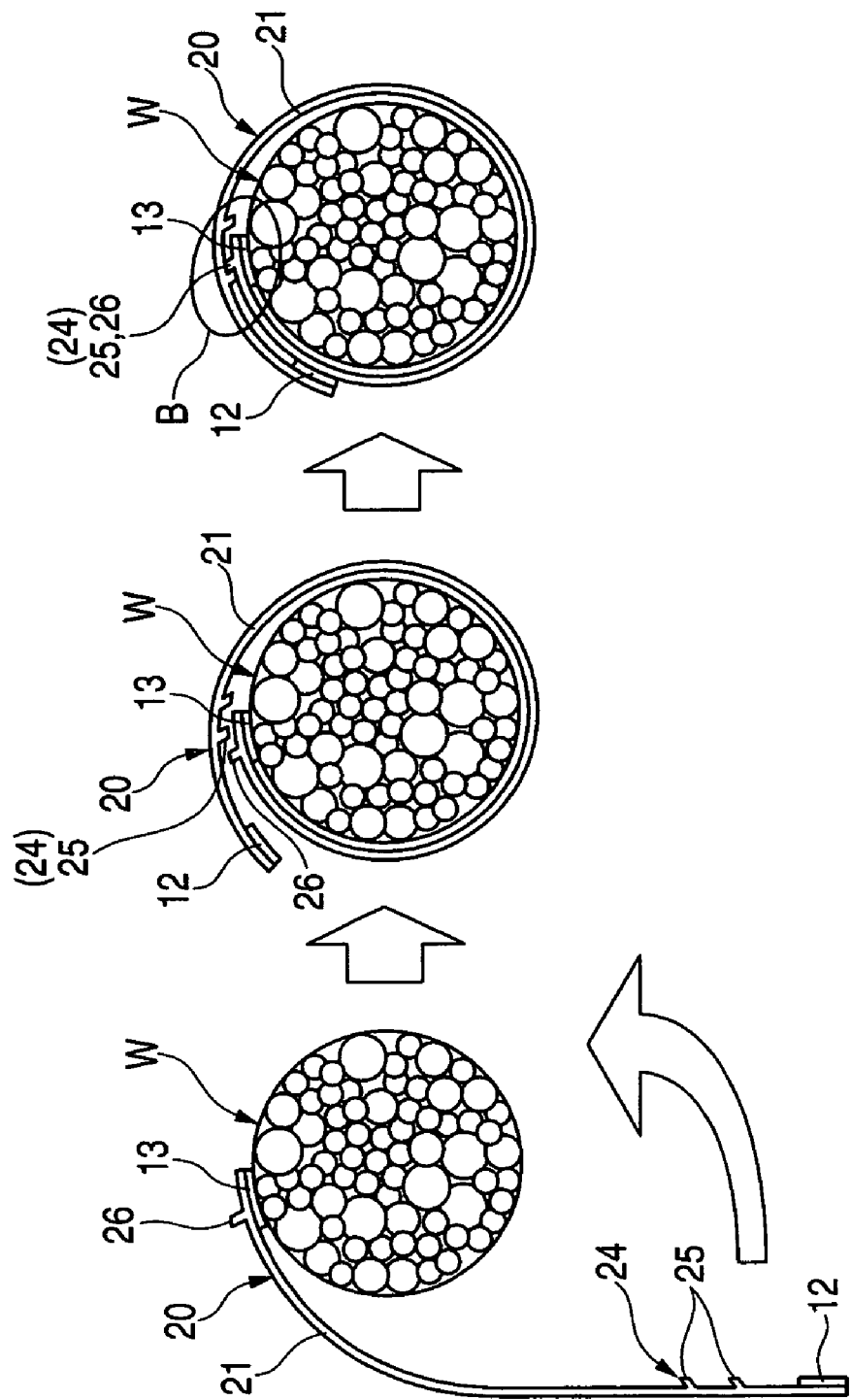
FIG. 7 is a cross-sectional view showing one example of a method of attaching the wire harness-armoring sheet of FIG. 5 to a wire harness.
Figure 8:
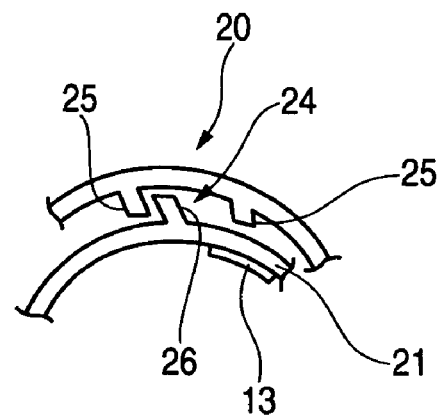
FIG. 8 is an enlarged detailed view, showing the engagement of projections of FIG. 7 with each other.

FIG. 5 is a perspective view showing a wire harness-armoring sheet of the second embodiment, and FIG. 6 is a side-elevational view of the wire harness-armoring sheet of FIG. 5. FIG. 7 is a cross-sectional view showing one example of a method of attaching the wire harness-armoring sheet of FIG. 5 to a wire harness, and FIG. 8 is an enlarged detailed view of opposite end portions of the armoring sheet of FIG. 7.

The wire harness-armoring sheet 20 of this embodiment has a positioning member 24 for positioning the sheet 20 when this sheet is attached to the wire harness W. Projections 25 are formed on one surface (or side) of a sheet body 21, and a projection 26 is formed on the other surface (or side) of the sheet body 21, and the positioning member 24 is formed by the projection 25 and the projection 26. However, members and so on, used in the wire harness-armoring sheet 20 of this embodiment, are entirely identical to those used in the wire harness-armoring sheet 10 of the above first embodiment.

The wire harness-armoring sheet 20 includes the sheet body 21 formed into a flat plate-like shape, and a pair of adhesive portions 12 and 13 (as described above for the first embodiment) which are formed respectively on widthwise-opposite end portions (left and right end portions in FIG. 5) of the one surface (upper surface in FIG. 5) of the sheet body 21, and extend generally parallel to one edge of the sheet body 21. The wire harness-armoring sheet 20 is attached to the wire harness W which is to be armored.

At least one (two in the illustrated embodiment) elongate projection 25 is formed on the sheet body 21. More specifically, the two projections 25 are formed integrally on the one surface of the sheet body 21, and are disposed near to the one end-side adhesive portion 12. The two projections 25 are parallel to each other, and are generally parallel to the one end-side adhesive portion 12, and are slightly inclined toward the other end-side adhesive portion 13.

The elongate projection (hereinafter often referred to as "the other surface-side projection") 26, formed on the other surface of the sheet body 21, is disposed near to the right end (or edge) thereof, and is generally parallel to the other end-side adhesive portion 13. This projection 26 is slightly inclined toward the one end-side adhesive portion 12.

Therefore, the projections (hereinafter often referred to as "the one surface-side projections") 25, formed on the one surface of the sheet body 21, and the projection 26, formed on the other surface thereof, are inclined toward each other. When the wire harness-armoring sheet 20 is wound on the wire harness, the two projections 25 and 26 are engaged with each other, thereby effecting the positioning.

The method of attaching the wire harness-armoring sheet 20 to the wire harness W is performed as shown in FIG. 7.

Referring to FIG. 7, the wire harness-armoring sheet 20 is disposed in such a manner that the one surface of the sheet body 21, having the adhesive portions 12 and 13 formed thereon, can serve as an inner surface and that the adhesive portions 12 and 13 are disposed generally parallel to the wire harness W.

In this condition, the adhesive portion 13, formed on the end portion of the sheet body 21 where the other surface-side projection 26 is formed, is adhesively fixed to the outer peripheral surface of the wire harness W (as shown in a left illustration of FIG. 7). At this time, the other surface-side projection 26 projects radially outwardly of the outer periphery of the wire harness W.

Then, the sheet body 21 of the wire harness-armoring sheet 20 is wound on the outer periphery of the wire harness W (as shown in a middle illustration of FIG. 7). The wire harness-armoring sheet 20 is wound on the outer periphery of the wire harness W in an amount exceeding the length of the outer periphery of the wire harness W.

At this time, when the one end-side adhesive 12 of the wire harness-armoring sheet 20 passes past the other surface-side projection 26, the one surface-side projection 25, disposed near to the adhesive portion 12, is retainingly engaged with the other surface-side projection 26 (as shown in FIG. 8), and thereafter the one end-side adhesive portion 12 is pressed against the outer surface of the sheet body 21 to be adhesively fixed thereto (as shown in a right illustration of FIG. 7).

In the above second embodiment of the invention, there is achieved an advantage that the wire harness-armoring sheet 20 can be rapidly and positively attached to the wire harness W, so that the attaching time and the cost can be reduced as in the first embodiment. In addition, there is achieved an advantage that a disadvantage that the flexibility of the wire harness W is adversely affected as a result of attaching the wire harness-armoring sheet 20 thereto can be avoided. Further, the following advantage can be obtained.

Namely, the projection 26 is formed on the other surface of the sheet body 21 facing away from the one surface thereof on which the one end-side adhesive portion 12 is formed, and in the operation for winding the wire harness-armoring sheet 20 on the outer periphery of the wire harness W in an amount exceeding the length of the outer periphery of the wire harness W, the projection 25 (disposed near to the adhesive portion 12) can be brought into retaining engagement with the other surface-side projection 26 when the one end-side adhesive portion 12 passes past the other surface-side projection 26. Therefore, the engagement of the two projections 25 and 26 with each other, along with the pressing of the one end-side adhesive portion 12 against the outer surface of the sheet body 21 so as to adhesively fix the former to the latter, can prevent the wire harness-armoring sheet 20 from displacement, and besides the wire harness-armoring sheet 20 can be more positively attached to the wire harness W.

The wire harness-armoring sheets of the invention are not limited to the above embodiments, and suitable modifications, improvements and so on can be made.

Figure 9A:
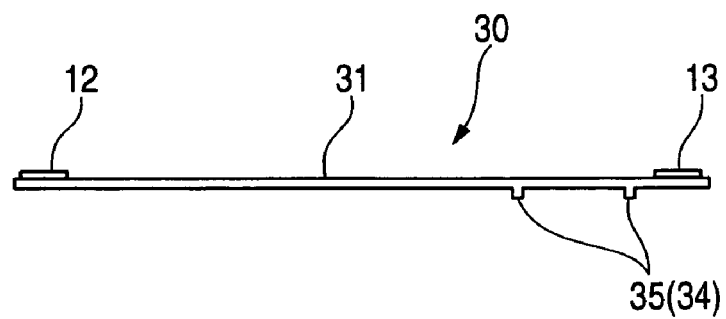
FIG. 9A is a side-elevational view of a modified wire harness-armoring sheet of the invention.
Figure 9B:
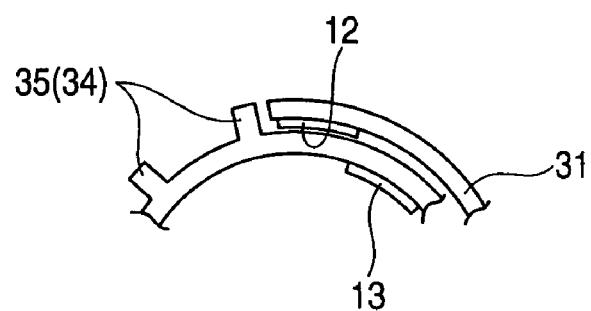
FIG. 9B is an enlarged view showing engaging portions.

For example, in the second embodiment, although the positioning member 24 of the wire harness-armoring sheet 20 includes the two projections 25 formed on the one surface of the sheet body 21, and the single projection 26 formed on the other surface of the sheet body 21, the positioning member is not limited to such a construction, and positioning member 34 as shown in FIGS. 9A and 9B can be used.

Namely, the one end-side adhesive portion 12 and the other end-side adhesive portion 13 are formed on one surface (or side) of a sheet body 31 of a wire harness-armoring sheet 30, and two elongate projections 35 are formed on the other surface (or side) of the sheet body 31, and are disposed near to the other end-side adhesive portion 13, the two projections 35 being spaced from each other. The positioning member 34 is formed by these projections 35.

For attaching this wire harness-armoring sheet 30 to the wire harness W, the other end-side adhesive portion 13 is adhesively fixed to the wire harness W so that the one surface of the sheet body 31, having the adhesive portions 12 and 13 formed thereon, can serve as an inner surface. Then, the sheet body 31 is wound around the outer periphery of the wire harness W, and one end of the sheet body 31 is brought into abutting engagement with one projection 35, and the one end-side adhesive portion 12 is pressed against an outer surface of the other end portion of the sheet body 31, and is adhesively fixed thereto, thereby effecting the positioning of the wire harness-armoring sheet 30, as shown in FIG. 9B.

With this construction, also, advantages, generally similar to those of the above embodiments, can be obtained.

Figure 10A:
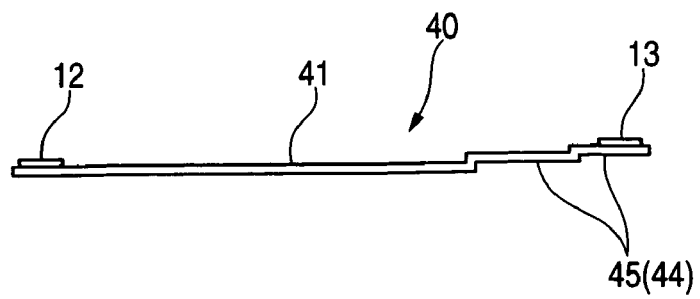
FIG. 10A is a side-elevational view of another modified wire harness-armoring sheet of the invention.
Figure 10B:
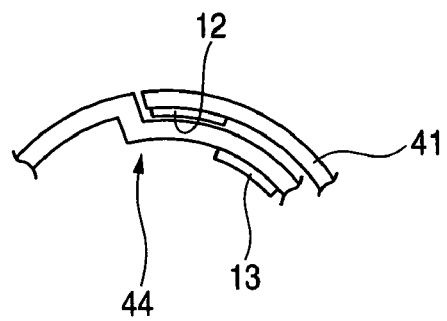
FIG. 10B is an enlarged view showing engaging portions.

As another modified form of the invention, there can be used positioning member 44 of a wire harness-armoring sheet 40 as shown in FIGS. 10A and 10B.

Namely, as shown in FIG. 10A, two step portions 45 are formed at an end portion of a sheet body 41 of a wire harness-armoring sheet 40 at which the other end-side adhesive portion 13 is formed on one surface (or side) thereof. The positioning member 44 of the wire harness-armoring sheet 40 is formed by these step portions 45.

For attaching this wire harness-armoring sheet 40 to the wire harness W, the other end-side adhesive portion 13 is adhesively fixed to the wire harness W so that the one surface of the sheet body 41 can serve as an inner surface. Then, the sheet body 41 is wound around the outer periphery of the wire harness W, and one end of the sheet body 41 is brought into abutting engagement with one step portion 45, and the one end-side adhesive portion 12 is pressed against an outer surface of the step portion 45, and is adhesively fixed thereto, thereby effecting the positioning of the wire harness-armoring sheet 40, as shown in FIG. 10B. With this construction, also, advantages, generally similar to those of the above embodiments, can be obtained.

Figure 11A:
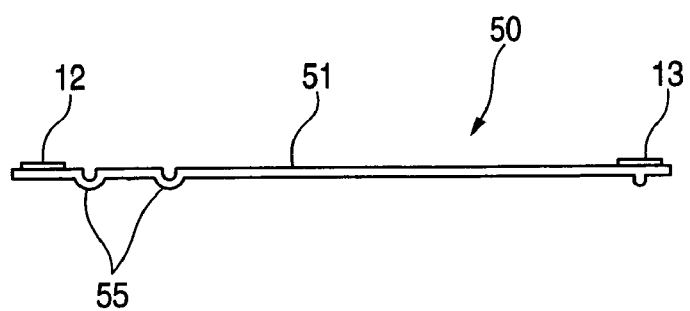
FIG. 11A is a side-elevational view of a further modified wire harness-armoring sheet of the invention.
Figure 11B:
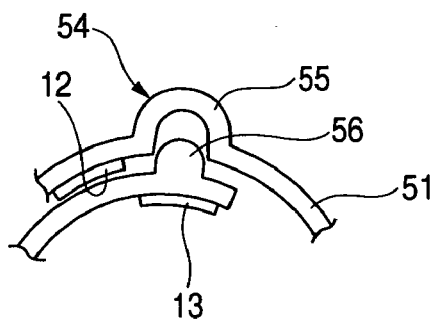
FIG. 11B is an enlarged view showing engaging portions.
Figure 12:
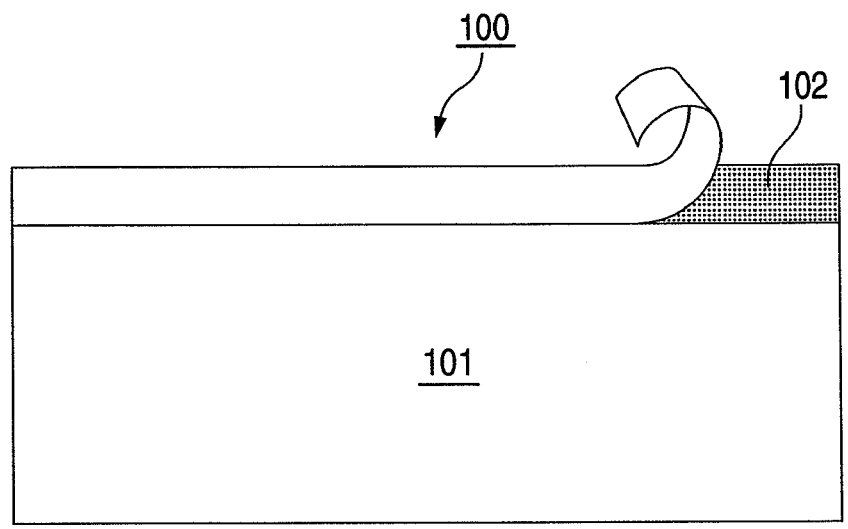
FIG. 12 is a plan view of a cover member disclosed in Patent Literature 1.
Figure 13:
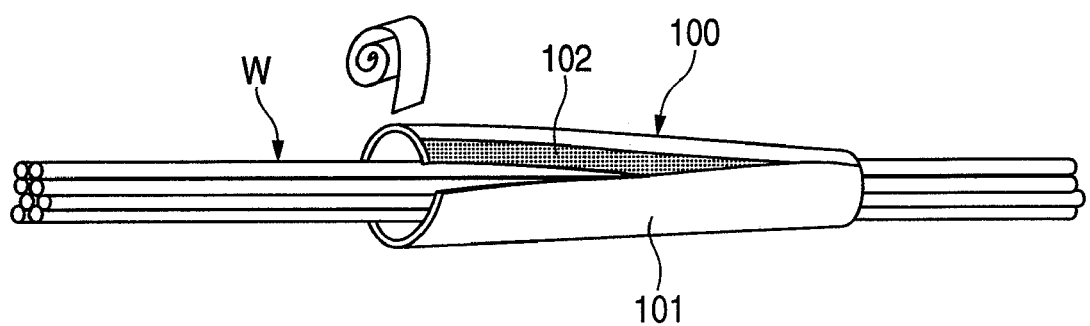
FIG. 13 is a perspective view showing a condition in which wires are in the process of being bound together by the cover member of FIG. 12.
Figure 14A:
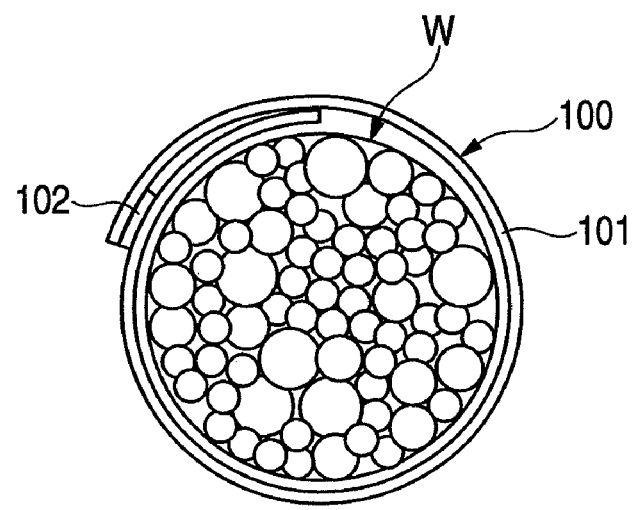
FIGS. 14A and 14B are cross-sectional views of examples of attaching methods, showing a condition in which the wires are bound together by the cover member of FIG. 12.
Figure 14B:
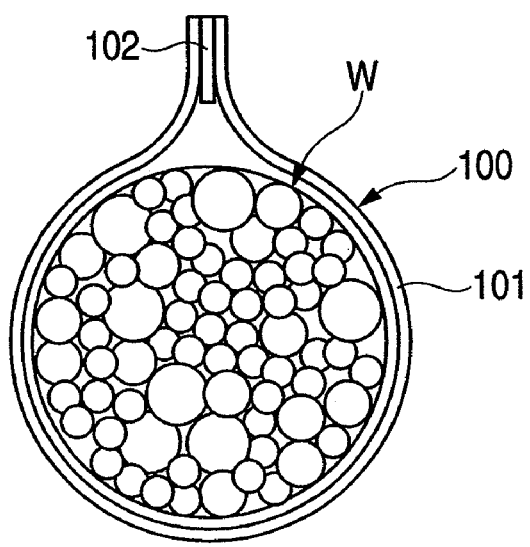
Figure 15:
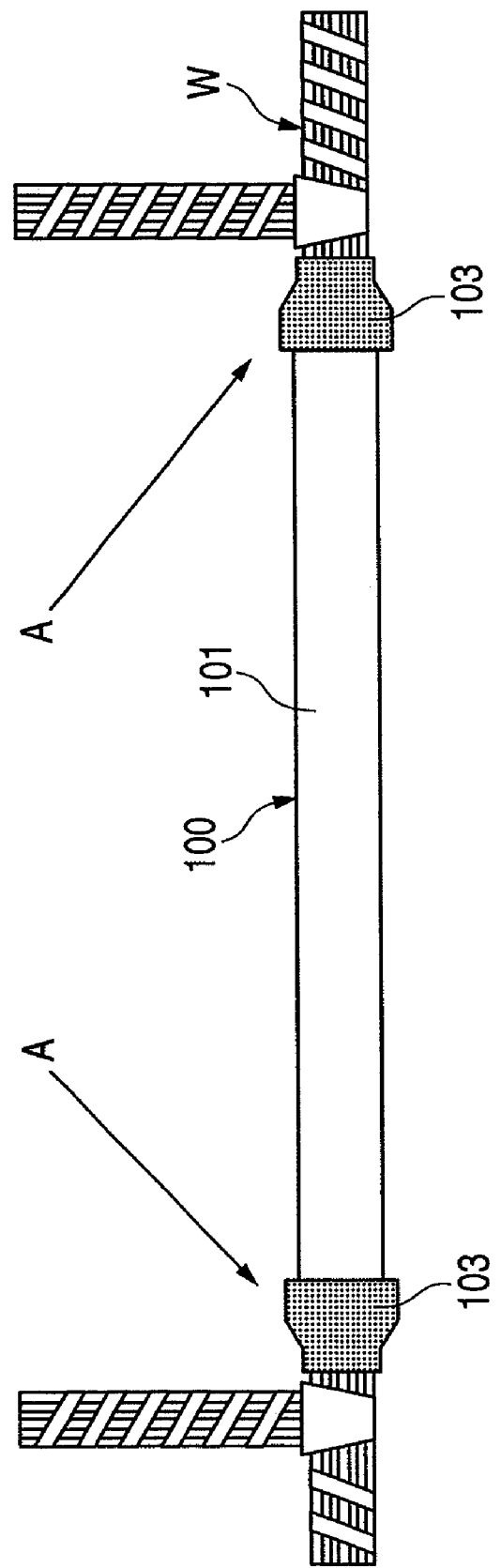
FIG. 15 is a perspective view of an important portion, showing a condition in which the cover member of FIG. 12 is attached to a wire harness.
Figure 16:
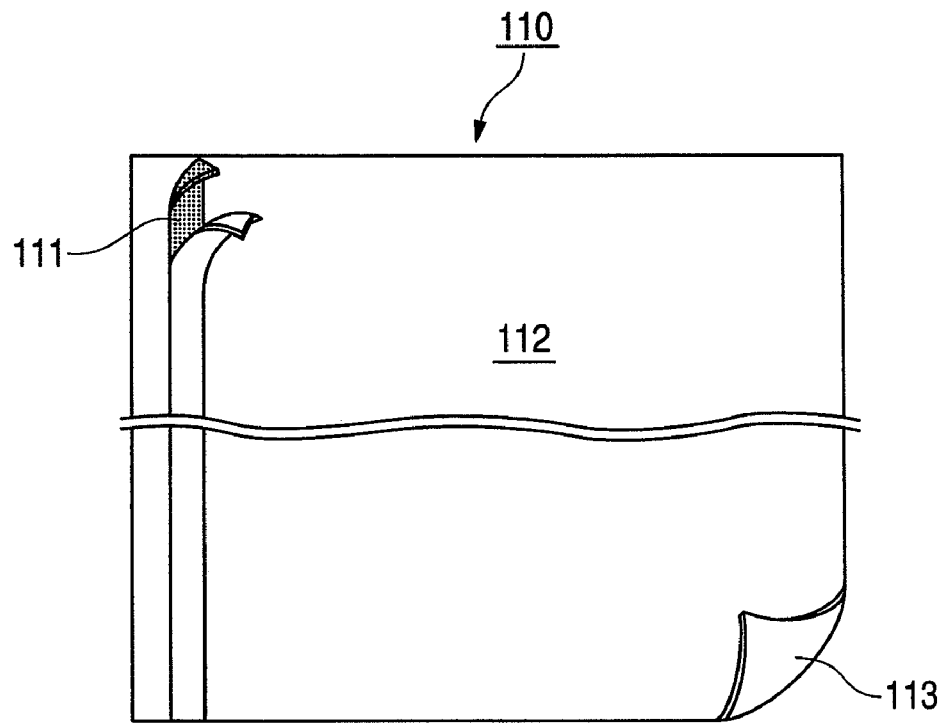
FIG. 16 is a plan view of a wire harness-binding sheet disclosed in Patent Literature 2.
Figure 17:
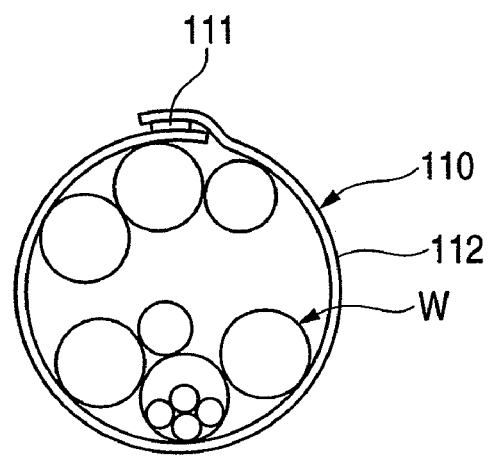
FIG. 17 is a cross-sectional view showing a condition in which a wire harness is bound by the wire harness-binding sheet of FIG. 16.
Figure 18:
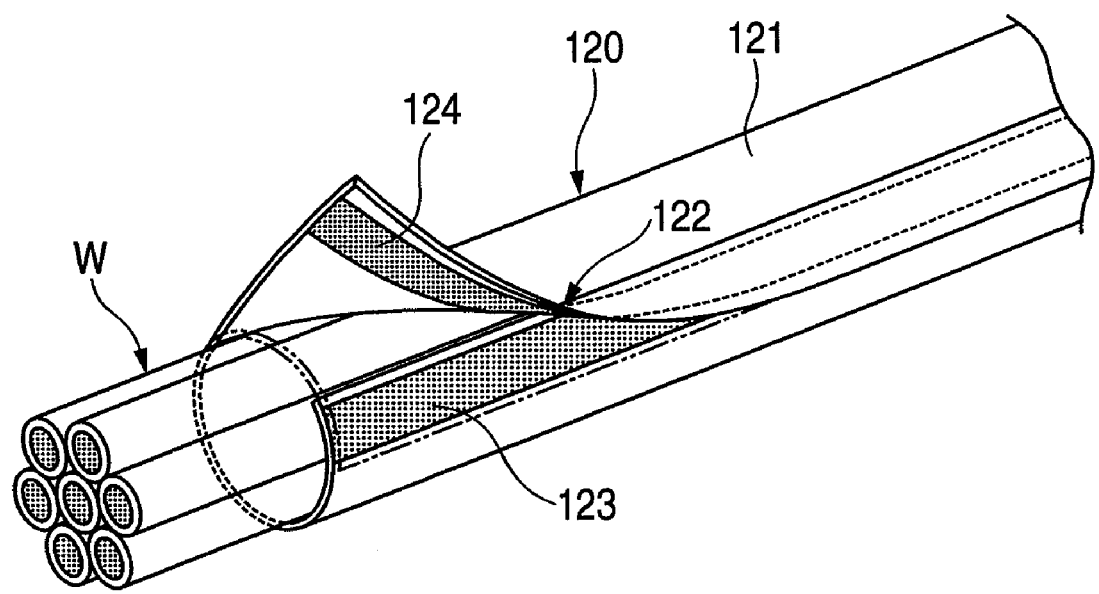
FIG. 18 is a perspective view showing a distribution wire-binding tube disclosed in Patent Literature 3.

As a further modified form of the invention, there can be used positioning member 54 of a wire harness-armoring sheet 50 as shown in FIGS. 11A and 11B.

Namely, as shown in FIG. 11A, one end-side adhesive portion 12 and the other end-side adhesive portion 13 are formed on one surface (or side) of a sheet body 51 of the wire harness-armoring sheet 50. Concave groove portions 55 are formed in the one surface of the sheet body 51, and project out of the plane of the other surface of the sheet body 51, the concave groove portions 55 being disposed adjacent to the one end-side adhesive portion 12 in generally parallel relation thereto. On the other hand, a convex portion 56 for fitting into the concave groove 55 is formed on the other surface of the sheet body 51 at the end portion thereof where the other end-side adhesive portion 13 is provided. The positioning member 54 of the wire harness-armoring member 50 is formed by the concave groove portion 55 and the convex portion 56.

For attaching this wire harness-armoring sheet 50 to the wire harness W, the other end-side adhesive portion 13 is adhesively fixed to the wire harness W so that the one surface of the sheet body 51 can serve as an inner surface. Then, the sheet body 51 is wound around the outer periphery of the wire harness W, and the concave groove portion 55 at the one end portion of the sheet body 51 is fitted on the convex portion 56, and also the one end-side adhesive portion 12 is pressed against the outer surface of the other end portion of the sheet body 51, and is adhesively fixed thereto, thereby effecting the positioning of the wire harness-armoring sheet 50, as shown in FIG. 11B. With this construction, also, advantages, generally similar to those of the above embodiments, can be obtained.

In the second embodiment, although the two projections 25 are formed on the one surface of the sheet body 11, while one projection 26 is formed on the other surface thereof, the invention is not limited to such a construction. One or more projections 25 may be formed on the one surface, and more than one (for example, two) projection 26 may be formed on the other surface.

With such a construction, the projections 25 and 26, corresponding to the size of the wire harness W, can be engaged with each other, and therefore the wire harness-armoring sheet can be used in a versatile manner, and it is not necessary to increase the kinds of wire harness-armoring sheets of different sizes.

The wire harness-armoring sheets of the invention, as well as the methods of attaching the same, can be suitably used as wire harness-armoring parts which can be rapidly and positively attached to the wire harness.

Although the invention has been illustrated and described for the particular preferred embodiments, it is apparent to a person skilled in the art that various changes and modifications can be made on the basis of the teachings of the invention. It is apparent that such changes and modifications are within the spirit, scope, and intention of the invention as defined by the appended claims.

The present application is based on Japan Patent Application No. 2005-156168 filed on May 27, 2005, the contents of which are incorporated herein for reference.

What is claimed is:

1. An armoring sheet for being attached to a wire harness, comprising:
   a sheet body that is formed in a flat plate shape and has a first face and a second face which is opposed to the first face;
   a first adhesive portion and a second adhesive portion that are provided on the first face of the sheet body; and
   a positioning member which has a first projection and a second projection on the sheet body,
   wherein the first adhesive portion is disposed at one end portion of the first face;
   wherein the second adhesive portion is disposed at other portion of the first face than the one end portion of the first face;
   wherein when the armoring sheet is attached to the wire harness, the first projection engages with the second projection to position the one end portion and the other end portion of the sheet body;
   wherein the first projection is formed on the first face of the sheet body adjacent and parallel to the first adhesive portion;
   wherein the second projection is formed on the second face of the sheet body along the second adhesive portion; and
   wherein a distance between the first adhesive portion and the one end portion is shorter than a distance between the first projection and the one end portion.

2. The armoring sheet according to claim 1, wherein the first and second adhesive portions are provided respectively at the opposite end portions of the first face of the sheet body, and extend generally parallel to one edge of the first face.

3. The armoring sheet according to claim 2, wherein the distance between the first adhesive portion and the second adhesive portion is greater than a length of an outer periphery of the wire harness.

4. The armoring sheet according to claim 1, wherein the first projection and the second projection are inclined toward each other.

5. The armoring sheet according to claim 1, wherein a longitudinal dimension of each of the first and second adhesive portions is greater than a length of the outer periphery of the wire harness.

6. A method of attaching an armoring sheet for being attached to a wire harness, comprising:
   providing the armoring sheet including a sheet body that is formed in a flat plate shape and has a first face and a second face which is opposed to the first face, a first adhesive portion and a second adhesive portion that are provided on the first face of the sheet body, a first projection and a second projection, and the first adhesive portion disposed at one end portion of the first face, and the second adhesive portion disposed at other portion of the first face than the one end portion of the first face, the first and second adhesive portions provided respectively at the opposite end portions of the first face of the sheet body, and extend generally parallel to one edge of the first face, and the distance between the first adhesive portion and the second adhesive portion being greater than a length of an outer periphery of the wire harness, the first projection is formed on the first face of the sheet body adjacent and parallel to the first adhesive portion, the second projection is formed on the second face of the sheet body along the second adhesive portion, and a distance between the first adhesive portion and the one end portion is shorter than the distance between the first projection and the one end portion;

adhesively fixing one of the first and second adhesive portions to an outer peripheral surface of the wire harness in a condition that the armoring sheet is arranged in a manner that the first face of the sheet body serving as an inner surface faces to the wire harness and the first and second adhesive portions are disposed substantially parallel to the wire harness;

winding the sheet body of the armoring sheet on the outer periphery of the wire harness in an amount exceeding the length of the outer periphery of the wire harness;

engaging the first projection with the second projection for positioning one end portion and the other end portion of the sheet body; and thereafter, adhesively fixing the other of the first and second adhesive portions to the second face of the sheet body.

7. A method of attaching an armoring sheet for being attached to a wire harness, comprising:

providing the armoring sheet including a sheet body that is formed in a flat plate shape and has a first face and a second face which is opposed to the first face, a first adhesive portion and a second adhesive portion that are provided on the first face of the sheet body, and a first projection and a second projection, the first adhesive portion disposed at one end portion of the first face, the second adhesive portion disposed at other portion of the first face than the one end portion of the first face, the first projection formed on the first face of the sheet body in adjacent, parallel to the first adhesive portion provided at the one end portion of the first face, the second projection formed on the second face of the sheet body along the second adhesive portion formed at the other end portion of the first face, a distance between the first adhesive portion and the one end portion is shorter than a distance between the first projection and the one end portion, and the first projection and the second projection being inclined toward each other;

adhesively fixing the second adhesive portion to an outer peripheral surface of the wire harness in a condition that the armoring sheet is arranged in a manner that the first face of the sheet body serving as an inner surface faces to the wire harness and the first and second adhesive portions are disposed substantially parallel to the wire harness;

winding the sheet body of the armoring sheet on the outer periphery of the wire harness in an amount exceeding the length of the outer periphery of the wire harness;

engaging the first projection with the second projection on the second face of the sheet body; and thereafter, adhesively fixing the first adhesive portion to the second face of the sheet body.

\* \* \* \* \*